Oct. 5, 1926.
W. H. LUTZ
1,602,276
COMBINED LEVEL AND PLUMB
Filed Oct. 19, 1923
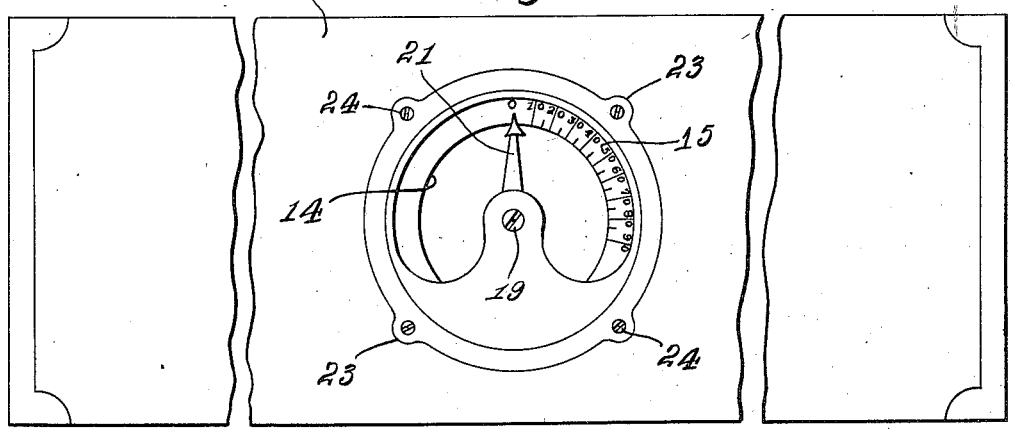
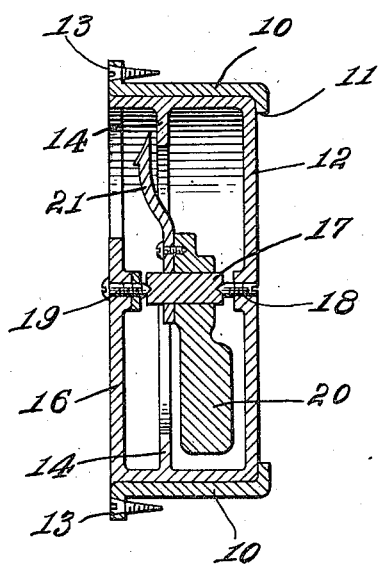
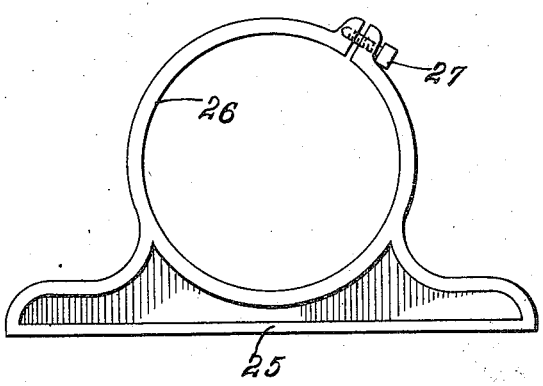
William H. Lutz
INVENTOR
BY Victor J. Evans
ATTORNEY
WITNESS:

Patented Oct. 5, 1926.

1,602,276

UNITED STATES PATENT OFFICE.

WILLIAM H. LUTZ, OF SUGAR GROVE, OHIO.

COMBINED LEVEL AND PLUMB.

Application filed October 19, 1923. Serial No. 669,586.

It is the purpose of this invention to provide a level indicating instrument designed to be associated with various kinds of supports, and constructed so as not to be easily impaired by rough usage, the invention residing in the construction, combination and arrangement of parts as claimed.

In the drawing forming part of this application, like numerals of reference indicate similar parts in the several views, and wherein:—

Figure 1 is a side view of the instrument showing it associated with a leveling board.

Figure 2 is a transverse sectional view through the instrument removed from said board.

Figure 3 is a view in elevation of a support with which the instrument may be used.

Referring to the drawings in detail, 10 indicates a ring-like member formed at one side with an inwardly projecting flange 11 against which the wall 12 of the instrument casing bears. It will be noted that this casing is of annular formation to snugly fit within the ring like member 10. An annular flange 14 extends inwardly from the inner periphery of the instrument casing, and this flange is graduated as at 15. The front of the casing is opened except for an arm 16 between which and the wall 12 of the casing is journalled a shaft 17. The opposed ends of this shaft have conical depressions to receive a center pin 18 supported by the wall 12 of the casing, and an adjusting screw 19 carried by the arm 16. Depending from this shaft is a pendulum secured to a pointer or indicating finger 21 the latter being arranged to move across the graduations on the flange 14. The instrument has an unlimited application or use, and may be associated with various supports. For instance, the instrument can be arranged in an opening or recess formed in a leveling board 22 of the usual construction, in which instance the ring like member 10 is formed with spaced apertured lugs 23 through which suitable fastening elements 24 are passed into the board 22 for holding the parts associated. Again, in Figure 3, I have shown another kind of support which includes a base 25 and a slit annular supporting member 26 which rises from the base, the terminals of this member 26 may be connected by means of an adjusting screw 27. Manifestly, the instrument can be removed from the board 22 and positioned within the support illustrated in Figure 3, to permit the instrument to be used in places where the board 22 could not be conveniently arranged. The instrument is not only simple in construction, but the parts are so arranged relatively that the instrument cannot be easily broken or impaired should it be subjected to rough usage, dropped or carelessly arranged in a tool box.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:—

An instrument of the character described comprising a ring like supporting member, apertured lugs projecting outwardly from one side thereof, an inwardly directed annular flange arranged at the other side thereof, a cylindrical casing designed to be snugly fitted within the ring like member and bear against said flange, said casing being closed at one side and open at the other, an inwardly directed flange supported by the wall of said casing and arranged within the latter, a segmental shaped arm forming an integral part of the casing and rising from the forward edge in parallelism with the closed side thereof, pivots carried by the wall and said arm of the casing, a shaft having conical depressions in the ends thereof to receive said pivots, a pendulum suspended from said shaft, the front side of the last mentioned flange having graduations thereon, and an indicating pointer carried by the pendulum and arranged to move across said flange for the purpose specified.

In testimony whereof I affix my signature.

WILLIAM H. LUTZ.